(12) United States Patent
Heinloth et al.

(10) Patent No.: US 9,168,595 B2
(45) Date of Patent: Oct. 27, 2015

(54) TOOL

(75) Inventors: Markus Heinloth, Postbauer-Heng (DE); Johann Woerner, Egersdorf (DE); Walter Thurnwald, Stein (DE)

(73) Assignee: KENNAMETAL INC., Latrobe, PA (US)

( * ) Notice: Subject to any disclaimer, the term of this patent is extended or adjusted under 35 U.S.C. 154(b) by 1451 days.

(21) Appl. No.: 12/531,792

(22) PCT Filed: Jan. 22, 2008

(86) PCT No.: PCT/DE2008/000110
§ 371 (c)(1),
(2), (4) Date: Sep. 17, 2009

(87) PCT Pub. No.: WO2008/113311
PCT Pub. Date: Sep. 25, 2008

(65) Prior Publication Data
US 2010/0104382 A1    Apr. 29, 2010

(30) Foreign Application Priority Data
Mar. 20, 2007  (DE) .......................... 10 2007 013 153

(51) Int. Cl.
| | |
|---|---|
| B23C 5/08 | (2006.01) |
| B23C 5/22 | (2006.01) |
| B23D 37/00 | (2006.01) |
| B23D 43/06 | (2006.01) |
| B23C 5/00 | (2006.01) |

(52) U.S. Cl.
CPC . *B23C 5/006* (2013.01); *B23C 5/08* (2013.01); *B23C 5/2234* (2013.01); *B23D 37/005* (2013.01); *B23D 43/06* (2013.01); *B23C 2200/367* (2013.01); *B23C 2215/20* (2013.01); *B23D 2043/063* (2013.01); *Y10T 407/1642* (2015.01); *Y10T 407/2272* (2015.01)

(58) Field of Classification Search
CPC ........ B23C 5/08; B23C 5/22; Y10T 407/1642
USPC ........... 407/12, 36–40, 44, 45, 15, 16, 25, 34, 407/35, 43, 53; 409/230–234
IPC ................................................ B23C 5/08, 5/22
See application file for complete search history.

(56) References Cited

U.S. PATENT DOCUMENTS 1,047,205 A * 12/1912 Gorten ............................ 407/46
1,125,102 A *  1/1915 Huther ............................ 407/47
(Continued)

FOREIGN PATENT DOCUMENTS

DE        4037984 A  *  6/1991
EP        0286771        10/1988
(Continued)

*Primary Examiner* — Sunil K Singh
*Assistant Examiner* — Sara Addisu
(74) *Attorney, Agent, or Firm* — Larry R. Meenan

(57) ABSTRACT

The invention relates to a tool for the outside milling or for the rotary broaching of tools that rotate about the longitudinal axis thereof during machining. A disk-shaped tool carrier includes peripherally arranged cutting inserts or cartridges having cutting inserts. According to the invention, the cutting inserts or the cartridges are arranged on a ring-shaped or partially ring-shaped, segment-shaped carrier that is removably fastened to a machine spindle either directly or indirectly by an adapter.

4 Claims, 4 Drawing Sheets

(56) References Cited

U.S. PATENT DOCUMENTS

Figure 4:
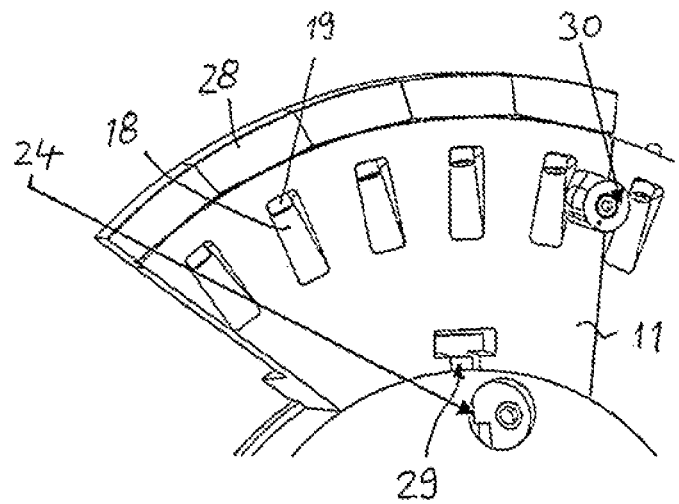
Figure 5:
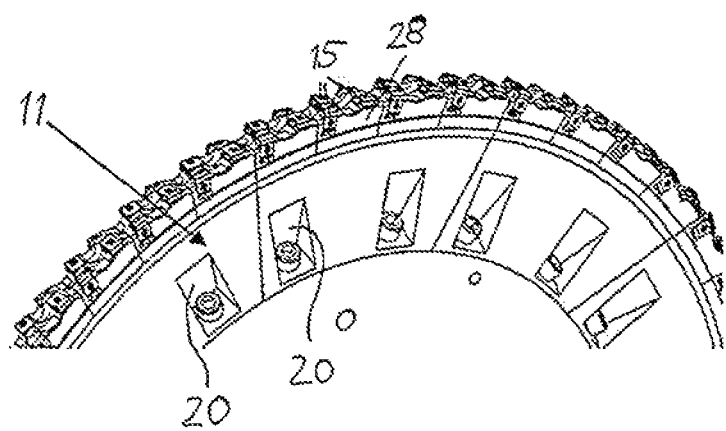

| | | | | |
|---|---|---|---|---|
| 1,460,029 A * | 6/1923 | Mattson | | 407/41 |
| 1,495,067 A * | 5/1924 | Conklin | | 407/25 |
| 2,278,576 A * | 4/1942 | Wildhaber | | 451/48 |
| 2,544,920 A * | 3/1951 | Fullerton | | 83/838 |
| 2,662,427 A * | 12/1953 | Smal | | 76/112 |
| 2,670,766 A * | 3/1954 | Hiltebrand | | 83/838 |
| 2,828,672 A * | 4/1958 | McMullen | | 409/53 |
| 2,975,507 A * | 3/1961 | Wilder | | 407/11 |
| 3,242,553 A * | 3/1966 | Bogsten | | 407/41 |
| 3,616,507 A * | 11/1971 | Wirfelt | | 407/40 |
| 4,204,787 A * | 5/1980 | McCray et al. | | 409/234 |
| 4,218,159 A * | 8/1980 | Langen | | 407/25 |
| 4,456,408 A * | 6/1984 | Glasow | | 407/35 |
| 4,464,086 A * | 8/1984 | Bentjens | | 407/25 |
| 4,533,281 A * | 8/1985 | Lacey | | 407/36 |
| 4,547,100 A * | 10/1985 | Naccarato et al. | | 407/39 |
| 4,563,929 A * | 1/1986 | Ringlee et al. | | 83/840 |
| 4,570,517 A * | 2/1986 | Souza et al. | | 83/838 |
| 4,728,228 A * | 3/1988 | Okunishi et al. | | 407/35 |
| 4,772,163 A * | 9/1988 | Scheer et al. | | 409/232 |
| 4,790,698 A | 12/1988 | Heffron | | 409/200 |
| 5,022,278 A * | 6/1991 | DeCaussin | | 74/110 |
| 5,037,248 A | 8/1991 | Heffron | | 707/12 |
| 5,090,845 A * | 2/1992 | Bentjens | | 407/52 |
| 5,158,400 A * | 10/1992 | Skinner et al. | | 407/12 |
| 5,201,353 A * | 4/1993 | Weill | | 144/236 |
| 5,290,135 A * | 3/1994 | Ball et al. | | 407/11 |
| 5,542,791 A * | 8/1996 | Ball et al. | | 407/21 |
| 5,711,642 A * | 1/1998 | Ball et al. | | 409/234 |
| 5,868,529 A * | 2/1999 | Rothballer et al. | | 407/36 |
| 6,030,153 A * | 2/2000 | Votsch et al. | | 407/36 |
| 6,488,456 B1 | 12/2002 | Satran | | 409/234 |
| 6,497,537 B1 * | 12/2002 | Francis et al. | | 407/37 |
| 7,216,682 B1 * | 5/2007 | Bennington | | 144/24.12 |
| 8,079,789 B2 * | 12/2011 | Heinloth et al. | | 409/232 |
| 2002/0106251 A1 * | 8/2002 | Ripley | | 407/35 |
| 2003/0143045 A1 | 7/2003 | Gesell | | 409/64 |
| 2005/0129475 A1 * | 6/2005 | Ripley et al. | | 409/131 |
| 2010/0196107 A1 * | 8/2010 | Ribbeck et al. | | 407/22 |
| 2011/0222973 A1 * | 9/2011 | Baer et al. | | 407/44 |
| 2012/0076599 A1 * | 3/2012 | Heinloth et al. | | 409/131 |
| 2012/0148351 A1 * | 6/2012 | Heinloth et al. | | 407/44 |
| 2014/0178136 A1 * | 6/2014 | Mokthar | | 407/51 |

FOREIGN PATENT DOCUMENTS

| | | | |
|---|---|---|---|
| EP | 2136951 A1 | | 12/2009 |
| EP | 2136951 B1 | | 3/2011 |
| JP | 55-165717 S | | 11/1980 |
| JP | 4-057310 H | | 5/1992 |
| JP | 5-070819 H | | 9/1993 |
| JP | 09076112 A | * | 3/1997 |
| JP | 2006-068863 | | 3/2006 |

* cited by examiner

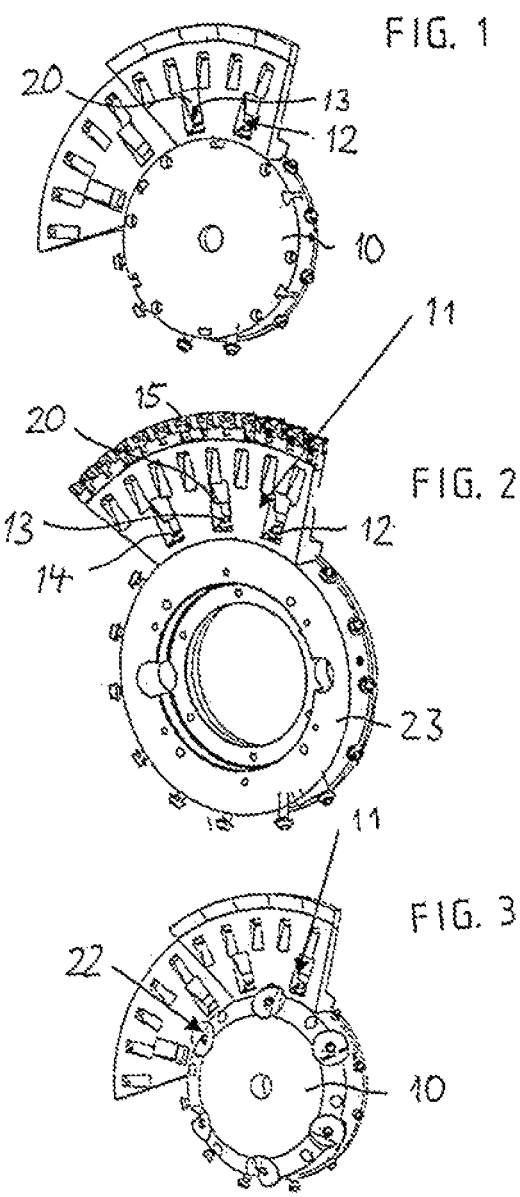

TOOL

CROSS REFERENCE TO RELATED APPLICATIONS

This application is the US national phase of PCT application PCT/DE2008/000110, filed 22 Jan. 2008, published 25 Sep. 2008 as WO2008/113311, and claiming the priority of German patent application 102007013153.6 itself filed 20 Mar. 2007, whose entire disclosures are herewith incorporated by reference.

The invention relates to a tool for external milling or turning/milling of workpieces rotating about their longitudinal axis during machining, comprising a tool-holding disk having peripheral cutting inserts or cassettes fitted with cutting inserts.

Such tools are used in particular in the manufacture of crankshafts or camshafts of motor vehicles for producing rotationally symmetrical surfaces lying both coaxially and eccentrically to a workpiece longitudinal axis. During the manufacture of such shafts, a workpiece cast with a certain oversize is often used as a basis in order to be able to conduct the subsequent cutting operations for producing the main and crank-pin bearings in a sufficiently reliable manner. Tools for milling or turning/milling or external milling are known from the prior art.

In milling, a linear milling tool is fed radially inward to the rotating workpiece to be machined. In turning/milling, a plurality of cutting inserts following one another are mounted on a circular outer periphery of a tool-holding disk, the cutting inserts continuously increasing stepwise in size along a first section of the disk circumference. This tool is pivoted along a pitch circle arc radially onto the rotating workpiece, as is known in principle from EP 0 313 644 [U.S. Pat. Nos. 4,790,698 and 5,037,724] or EP 0 286 771. On the tools used there, two geometrically different types of cutting inserts are used for crank-pin machining and for making the undercut, to which end tools are used as described, for example, in DE 100 279 45 [US 2003/01143045]. Such a side-milling cutter is used in external milling in such a way that the workpiece, namely the crankshaft or camshaft, rotates slowly, while the side-milling cutter is rotated about its axis at a substantially higher speed. In external milling, which is used in particular for producing the crank-pin bearings of a crankshaft, the cutting speed therefore results from the rotation of the external milling cutter and the slower rotation of the crankshaft.

The economic efficiency of milling depends on various factors including, in particular, the replacement times of the tools. If the cutting inserts on a tool holder are worn, they must be exchanged, it being necessary according to the prior art, on a side-milling cutter, to either dismount every individual cutting insert, replace it with a new one and secure the new cutting insert or exchange cassettes having one or more cutting inserts, to which end dismounting of the cassette beforehand and resecuring are likewise necessary. During such refitting times, milling is stopped unless a complete side-milling cutter is removed from the milling machine and replaced by a prepared side-milling cutter.

The object of the invention is to minimize the refitting times and to simplify handling during the refitting.

This object is achieved by a tool as claimed in claim 1 which is characterized according to the invention in that the cutting inserts or the cassettes are mounted on an annular or partially ring-shaped, namely segmental holder detachably fastened either directly to a machine spindle or indirectly to a machine spindle via an adapter.

The annular or segmental holder can be removed or fitted much more quickly so that long refitting times are avoided. The annular or segmental holder that is fitted with a plurality of cutting inserts can also be produced inexpensively as a tool holder, and therefore additional material costs are only marginal. If segmental holders are used, a plurality of segments positioned against one another form a complete peripheral ring of cutting inserts or, in the case of strip-shaped tools for rotary or turning/milling, the complete holder required.

Unlike the mounting screws for the cutting inserts, clamping or screw bodies with which the holder is fastened to an adapter or directly to the machine spindle can be mounted in such a way that they lie in a recess so as to be protected from contamination or abrasive effects or impact stress. As small a number of fastening means as possible are selected for the respective tool holder.

If segmental holders are used that produce a complete ring in an external milling cutter, a segment angle is selected that is, on the one hand, as large as possible such that only a small number of individual holders have to be changed; on the other hand, the weight is distributed in such a way that a manual change without further lifting mechanisms is possible without any difficulty. The weight of an individual segment can thus be restricted, e.g. to 10 to 12 kg. The advantage of such a configuration consists in the fact that an otherwise necessary loading crane for changing a complete external cutter disk can be dispensed with.

Further preferable configurations follow from the dependent claims.

When attaining the object by means of individual segments, provision is preferably made for each segmental holder to be fastened to the machine spindle by means of at least one respective screw, preferably two or three screws. However, the number of screw connections substantially depends on the size of the holder; thus a holder which includes an angular range of 45° is of course preferably fastened by means of three screws, whereas a smaller angular segment only requires two screws. The individual segments, which together are to form a closed circular ring, lie with their respective radially extending end faces against the respective adjacent end face of another holder.

Each screw preferably passes through a hole formed in the holder and is threaded into a respective tapped hole in the machine spindle.

However, the fastening is also conceivable the other way round, namely that the threaded shank of the screw engages in a tapped hole in the holder and the screw passes through a hole formed in the spindle. The screws preferably have a head that can be recessed in the holder or in the machine spindle in the installed condition (depending on the arrangement).

If it is desired to avoid having to completely unscrew every mounting screw when changing a holder in order to be able to remove the holder, provision may be made in an alternative embodiment for the segmental holder to have slot-shaped recesses open on one side and a stop at the other end for the lateral insertion of a screw shank before the fixing by means of the screws.

In this embodiment, the screw merely needs to be released by rotary actuation of the head, after which the holder can be removed laterally on account of the slot-shaped opening and replaced by a new holder.

If a holder in the form of an annular disk is selected, it would first of all be appropriate to use the same fastening by means of screws which is also described above for individual segments. According to an alternative, however, the holder, as an annular disk, is preferably restrained axially against an adapter or a machine spindle, to which end clamping wedges that can be actuated by tightening screws and/or, for angular locking, springs that rest in respectively groove-shaped notches of the parts to be restrained together are preferably provided. However, a bayonet connection between the holder and the adapter or the machine spindle may also be selected, wedge clamping preferably being used between the holder and the adapter or the machine spindle, in particular in such a way that the clamping wedge can be actuated by means of a draw rod. The annular disk is preferably secured against axial displacements by means of an axial stop surface.

Figure 6:
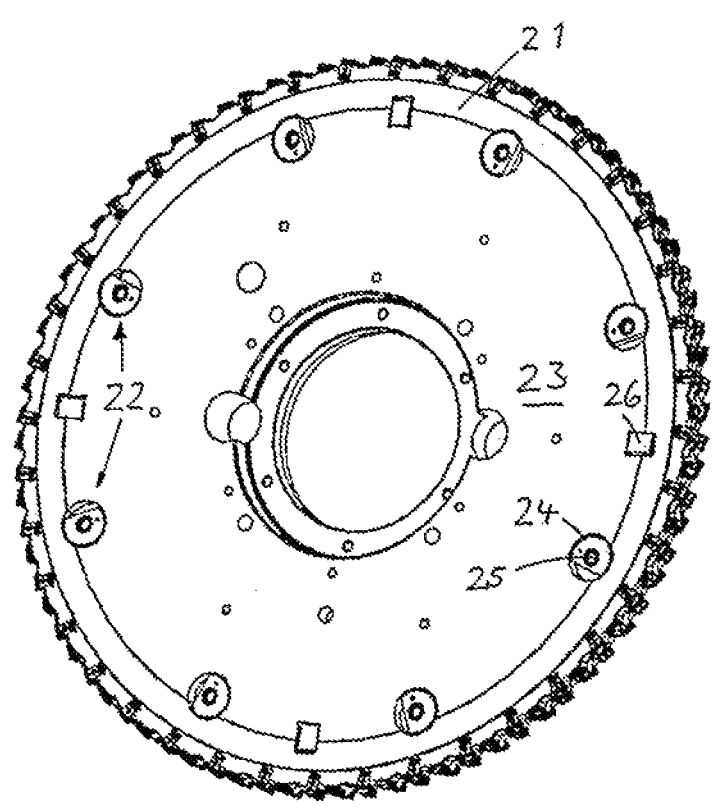
Figure 7:
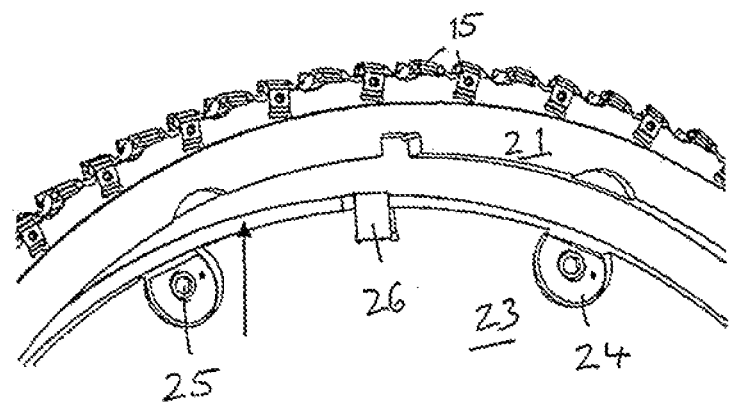
Figure 8:
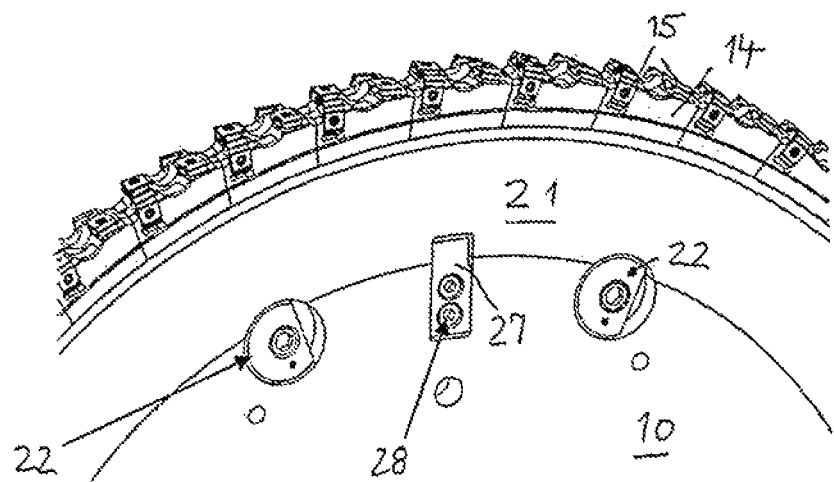

Embodiments of the invention are described in the drawings, in which:

FIGS. 1-5 each show a partial view of a side-milling cutter having segmental tool holders in different embodiments, FIG. 6 shows a side-milling cutter having an annular tool holder, and FIGS. 7 and 8 each show variants of the mounting of an annular tool holder in a detailed view.

The same spindle 10, to which either the tool holder is fastened directly or an adapter is fastened, is shown in each figure. The holder may be of either segmental or annular. In the embodiments shown in FIGS. 1 to 5, segments 11 are used that are each fastened to the spindle 10 by two or three screws 12, 13 and 14. In the case shown in FIG. 1, ten segments 11 are required that together form a closed ring to which cassettes 28 having a plurality of different cutting inserts 15 are fastened at the outer periphery. The fastening and arrangement of the individual cassettes and of the indexable inserts is known in detail from the prior art. Each segment has two recesses 16 and 17 into which the mounting screws can be inserted in such a way that the screw head of a socket screw, which is preferably used, is "concealed" in these recesses 16 and 17. The head bears with pressure on the base surface of the respective recess 16 and 17, the screw shank passing through a hole (not shown in detail) in the segmental holder 11 and the screw otherwise being fastened with its thread in a tapped hole in the spindle 10 or an adapter.

For a cutter disk having an outside diameter of 700 mm, twenty screws are required for ten segments 11, which in the embodiment shown have a mass of 3.4 kg. The recesses 16 and 17 may be accessible from only one side or also from both sides.

In the embodiment shown in FIG. 2, individual segments 11 are also used, but the segments 11 are fastened to an adapter 23. It can also be seen that three tightening screws serve to fasten each segment 11. The tightening screws 19 are located in respective recesses 20 such that their screw heads are protected.

FIG. 3 shows an embodiment in which the individual segments 11 are also fixed axially via additional clamps 22. The clamps 22 are each formed by a wedge-shaped clamping member by means of which each segment is fixed in a longitudinally or axially. On the side opposite the clamps 22, the segments, which are of L-section, are secured against axial displacement by a disk extending radially beyond the outer edge of the spindle 10.

FIG. 4 shows a segment 11 having a slot-shaped recess 29 that is open on one end but that forms at its opposite blind end an abutment for a screw shank. Clamping wedges 24 provide for axial retention here too. The individual segments 11 can be fixed against one another by clamping pieces 30 to form a complete ring. As can be seen from FIG. 4, further recesses 18 are provided that hold respective tightening screws 19 that secure respective cassettes 28, only shown schematically in FIG. 4. The cassettes hold individual cutting inserts that can be seen, for example, in FIG. 5.

FIGS. 6 and 7 show an embodiment having a closed annular holder 21 that is fastened to an adapter disk 23 via eight clamps 22. The clamping is done by clamping wedges 24 that, in combination with a tightening screw 25 passing through a central hole, form a clamping member by means of which the ring 21 is fixed to the adapter 23. Springs 26 that engage in notches in the adapter and in the ring 21, serve to fix the angular orientation of the parts relative to one another.

Here, in order to change the ring 21, the screws 25 have to be released, after which the washers can be oriented in such a way that the ring 21 is exposed and can be removed. Due to the small radial dimension of the ring 21, at a cutter diameter of 700 mm a weight of about 15 kg can be maintained for the ring 21, which is fastened via a total of eight clamps 22 and can be handled manually.

FIG. 8 shows the ring 21 as holder for the cassettes 28. The ring 21 is clamped in place on the spindle 10 via a plurality of clamps 22 in the manner described above. Here, a spring 27 which is fixed to the spindle 10 via two screws 28 is used to orient the ring 21.

All the holders 11 or 21 shown may be of L-section having a slot-shaped recess 29 open at one end for passing a screw shank through. A stop is preferably provided on the other end. The advantage of this embodiment lies in the fact that the segmental holder 11, 21, with preinstalled screws 12, 13 or 14 or clamping wedges 24, can be pushed from one side onto the adapter 23 up to the stop, thereby providing for accurate positioning. The screws or clamping wedges are tightened in order to fasten the L-shaped holder 11, 21. This variant is especially suitable for rapid tool change, since the screws or clamping wedges only have to be tightened over a small region.

LIST OF DESIGNATIONS

10 Spindle
11 Segment
12, 13, 14 Screw
15 Cutting insert
16, 17 Recess
18 Recess
19 Tightening screw
20 Recess
21 Annular holder
22 Clamps
23 Adapter
24 Clamping wedge
25 Screw
26, 27 Spring
28 Cassette
29 Groove
30 Clamping pieces

The invention claimed is:

1. A tool for externally milling a workpiece rotated about a workpiece axis adjacent the tool, the tool comprising:
   a support comprising an adapter disk or a spindle, the support centered on and rotatable about a tool axis and having an outer periphery centered on the tool axis;
   an annular holder having a L-shaped cross section with a slot-shaped recess open at one end for lateral insertion of a screw shank, wherein the annular holder is a continuous ring;
   clamps for releasably securing the annular holder to the outer periphery of the support;
   cutting inserts or cassettes fitted with cutting inserts, wherein the cutting inserts or the cassettes are mounted on the annular holder; and springs disposed in notches in the annular holder and in the support for fixing an angular orientation of the annular holder with respect to the support.

2. The tool defined in claim 1, wherein the support is formed radially inward of each segment with at least one axially open groove having a radially outer end forming an abutment and formed with a radially outwardly extending bore in which a respective screw is received with a head of the screw bearing radially outward on the abutment.

3. The tool defined in claim 2, wherein the screw head is wholly recessed below an axial face of the support when tightly threaded to the respective segment.

4. The tool defined in claim 1, wherein each clamp comprises a clamping wedge that, in combination with a screw passing through the clamping wedge, releasably secures the annular holder to the outer periphery of the support.

* * * * *